UNITED STATES PATENT OFFICE.

R. F. H. HAVEMANN, OF NEW BRUNSWICK, NEW JERSEY.

IMPROVEMENT IN COMPOSITIONS OF CAOUTCHOUC.

Specification forming part of Letters Patent No. 31,241, dated January 29, 1861.

*To all whom it may concern:*

Be it known that I, RUDOLPH F. H. HAVEMANN, of New Brunswick, in the county of Middlesex and State of New Jersey, have invented a new and useful Improvement in Compounds of India-Rubber, Gutta-Percha, and their Allied Gums; and I do hereby declare that the following is a full, clear, and exact description of the same.

My invention relates to the production of compounds of india-rubber, gutta-percha, and their allied gums of a texture and appearance resembling ivory or bone. Previous attempts to produce such compounds have been only partially successful. A hard white substance is produced by the process described in the schedule of Letters Patent granted to G. A. Engelhard and myself, dated November 22, 1859; but this takes a very long time to harden, and when hardened is too brittle and porous to be of much practical value.

My invention consists in the production of a new compound forming a more perfect substitute for wood, ivory, and bone, and which is sooner ready for use by the addition to the chlorine rubber compound produced, as described in the Letters Patent above mentioned, of suitable quantities of lime, aqua-ammonia, and sal-ammoniac. The treatment of the gum with chlorine may be effected by either of the two processes specified in those Letters Patent; but I prefer to use that process in which the gum is reduced to a solution before being subjected to the action of chlorine. When the gum has been dissolved and afterward treated with chlorine, or has been treated with chlorine and afterward dissolved, I wash out nearly all of the solvent with alcohol, leaving only a sufficient portion to keep the gum in a plastic state. I then add aqua-ammonia in about the proportion of one-eighth ($\frac{1}{8}$) of a dram to every pound of gum, and after grinding or stirring the mass about till a thorough mixture is effected I add one-eighth ($\frac{1}{8}$) of a dram of powdered carbonate of ammonia and half ($\frac{1}{2}$) a pound of very pure lime (oxide of calcium) in a finely-powdered state to each pound of gum, and after stirring or grinding the whole well together till a thorough incorporation is effected, I place the compound in a suitable box or mold of metal and subject it to a heavy pressure, which I increase from time to time till it is incapable of further condensation, when I remove it from the press and mold or box and expose it to a heat of about 240° Fahrenheit till it becomes perfectly hard, when it will be compact and white and of a texture and appearance resembling ivory, and will withstand the action of all varieties of climate, hot or greasy water, and of acids.

The use of the aqua-ammonia and carbonate of ammonia in the compound is to effect the thorough incorporation of the lime with the gum.

What I claim as my invention, and desire to secure by Letters Patent, is—

The compound produced by the admixture of lime, aqua-ammonia, and carbonate of ammonia, in the manner herein described, with the within mentioned patented compound of chlorine, treated rubber, or its chlorine-treated allied gums, as set forth.

R. F. H. HAVEMANN.

Witnesses:
L. W. BENDRÉ,
C. W. COWTAN.